US007197707B2

(12) United States Patent
Cicchitelli et al.

(10) Patent No.: US 7,197,707 B2
(45) Date of Patent: Mar. 27, 2007

(54) AUTOMATICALLY SELECTING FONTS

(75) Inventors: Lorenzo Cicchitelli, Cecil Hill (AU); Timothy Mark Morris-Yates, Artarmon (AU); Gerard Anthony Hill, Castle Hill (AU); Catherine Jane Arnold, Picnic Point (AU)

(73) Assignee: Canon Kabushiki Kaisha, Tokyo (JP)

( * ) Notice: Subject to any disclaimer, the term of this patent is extended or adjusted under 35 U.S.C. 154(b) by 551 days.

(21) Appl. No.: 09/785,292

(22) Filed: Feb. 20, 2001

(65) Prior Publication Data

US 2001/0021937 A1 Sep. 13, 2001

(30) Foreign Application Priority Data

Feb. 28, 2000 (AU) .................................... PQ5893

(51) Int. Cl.
*G06F 15/00* (2006.01)

(52) U.S. Cl. ....................... 715/542; 715/529; 715/531

(58) Field of Classification Search ................ 715/542, 715/515, 529, 467, 531; 345/467, 471
See application file for complete search history.

(56) References Cited

U.S. PATENT DOCUMENTS 5,493,677 A * 2/1996 Balogh et al. ........... 707/104.1
5,499,366 A * 3/1996 Rosenberg et al. ............ 707/4
5,500,931 A * 3/1996 Sonnenschein ............. 715/529
5,586,242 A * 12/1996 McQueen et al. .......... 345/467
5,675,788 A * 10/1997 Husick et al. ........... 707/104.1
5,787,254 A * 7/1998 Maddalozzo et al. ....... 709/228
5,832,530 A * 11/1998 Paknad et al. .............. 715/500
5,893,915 A * 4/1999 Cordell et al. .............. 715/513
5,926,565 A 7/1999 Froessl ....................... 382/181
5,987,459 A * 11/1999 Swanson et al. ............... 707/6
6,208,988 B1 3/2001 Schultz .......................... 707/5
6,237,010 B1 * 5/2001 Hui et al. ................... 715/502
6,275,829 B1 * 8/2001 Angiulo et al. .......... 707/104.1
6,324,545 B1 * 11/2001 Morag ........................ 707/202
6,466,970 B1 * 10/2002 Lee et al. ................... 709/217
6,848,075 B1 * 1/2005 Becker et al. ........... 715/501.1
6,853,980 B1 * 2/2005 Ying et al. ..................... 705/27
7,010,587 B1 * 3/2006 Shiimori ..................... 709/223

FOREIGN PATENT DOCUMENTS

EP 1 077 421 A2 2/2002

* cited by examiner

*Primary Examiner*—Thu V. Huynh
(74) *Attorney, Agent, or Firm*—Fitzpatrick, Cella, Harper & Scinto

(57) ABSTRACT

The method automatically selects a font from a collection of fonts for use in captions associated with images. The method first selects 110 a font from a library of fonts, based on information provided with the images. The method then sets 112 the existing font of the captions with the selected font. In another embodiment, the method automatically selects a font for use in hyperlink texts. The method first selects 310 a font from a collection of fonts, based on information associated with the hyperlink texts. The method then replaces 312 the existing font of the hyperlink texts with the selected font.

15 Claims, 7 Drawing Sheets

AUTOMATICALLY SELECTING FONTS

TECHNICAL FIELD OF THE INVENTION

The present invention relates to automatically selecting a font from a collection of fonts for use in one or more texts and such like. The present invention also relates to automatically selecting a theme from a collection of themes for use in one or more objects and such like.

BACKGROUND

Electronic multimedia resources have become increasingly popular in recent times. These resources take many diverse forms, such as hypertext pages including hyperlinks through to electronic photo-albums.

A hyperlink is an element of a web page that, when clicked with a mouse, allows one to call up another web document from the same or a completely different server. Hyperlinking is one of the principal methods used to navigate around documents on the World Wide Web. The traditional way of displaying hyperlinks on a web browser is to underline the word or words where the link is available. On colour systems or colour printers, the hyperlink may be shown in a different colour to regular text to give it added emphasis.

Typical techniques do little to enhance the distinguishability of the hyperlinks. Generally, the same font, style and font size are used to display the hyperlink meaning that they meld with the surrounding text, and this is especially true when hypertext is printed.

The existing electronic photo-albums typically take the form of a collection of images stored using a non-volatile memory device, from which a user can retrieve the image for displaying on a display device. Usually, the images are gathered in digital form, and may, for example, be scanned by an electronic scanner, down-loaded from the Internet or produced by a digital camera. A collection of these images can be stored electronically to create an electronic photo-album, analogous to the traditional family photo-album, which uses photographic prints.

Presently, electronic photo-albums take the form of a collection of images, a user of the album being able to associate a caption or brief description with each image. For example, a user can collect a series of family photographs of a wedding, whether from a digital video or still camera, and associate a caption such as a date and a brief description of the event with each image. If desired, an electronic photo-album can be reproduced from the memory device by a high quality output device, such as a high-resolution colour printer, to produce an album substantially similar to a conventional photo-album.

A caption is a text string, positioned on a page such that it is assumed to be associated with one or more images also located on the page. In general captions are used to describe the content of the images.

Traditionally, the style of the caption, including the font, colour, size etc, is decided on by the person authoring the page. In a system where images are automatically added, the user may find the style of the captions is generic and plain, and perhaps is not appropriate for the images displayed. For the user to alter the style of each caption can be time consuming and, in some cases, a complex task.

SUMMARY OF THE INVENTION

It is an object of the present invention to substantially overcome, or at least ameliorate, one or more disadvantages of existing arrangements.

According to one aspect of the invention, there is provided a method of automatically selecting a font from a collection of fonts for use in one or more captions associated with one or more images, wherein the method comprises the steps of: automatically selecting one or more fonts from said collections of fonts, based on information provided with the one or more images; and setting the font of the one or more captions to one of the selected one or more fonts.

According to another aspect of the invention, there is provided a method of automatically selecting a font from a collection of fonts for use in one or more captions associated with one or more images, wherein the method comprises the steps of: analysing meta-data associated with the one or more images to determine a key feature amongst the meta-data; searching a library of fonts, each said font having a set of one or more associated key features; automatically selecting one or more fonts from the font library having an associated said key feature best matching the said determined key feature; and setting a font of the one or more captions to one of the selected one or more one fonts.

According to another aspect of the invention, there is provided a method of automatically selecting a theme from a collection of themes for use in one or more objects associated with one or more pages, wherein the method comprises the steps of: automatically selecting one or more themes from said collections of themes, based on information provided with the said one or more pages; and setting the theme of the one or more objects with one of the selected one or more themes.

According to another aspect of the invention, there is provided a method of automatically selecting a font from a collection of fonts for use in one or more texts, wherein the method comprises the steps of: automatically selecting one or more fonts from said collections of fonts, based on information associated with said one or more texts; and setting the font of the one or more texts to one of the selected one or more fonts.

According to another aspect of the invention, there is provided a method of automatically selecting a font from a collection of fonts for use in one or more hyperlink texts, wherein the one or more texts are in an initial font and the method comprises the steps of: automatically selecting one said font from said collections of fonts, based on information associated with said one or more hyperlink texts; and replacing the font of the one or more hyperlink texts with the selected font.

According to another aspect of the invention, there is provided apparatus for automatically selecting a font from a collection of fonts for use in one or more captions associated with one or more images, wherein the apparatus comprises: means for automatically selecting one or more fonts from said collections of fonts, based on information provided with the one or more images; and means for setting the font of the one or more captions to one of the selected one or more fonts.

According to another aspect of the invention, there is provided apparatus for automatically selecting a font from a collection of fonts for use in one or more captions associated with one or more images, wherein the apparatus comprises: means for analysing meta-data associated with the one or more images to determine a key feature amongst the meta-data; means for searching a library of fonts, each said font having a set of one or more associated key features; means for automatically selecting one or more fonts from the font library having an associated said key feature best matching the said determined key feature; and means for setting a font of the one or more captions to one of the selected one or more one fonts.

According to another aspect of the invention, there is provided apparatus for automatically selecting a theme from a collection of themes for use in one or more objects associated with one or more pages, wherein the apparatus comprises: means for automatically selecting one or more themes from said collections of themes, based on information provided with the said one or more pages; and means for setting the theme of the one or more objects with one of the selected one or more themes.

According to another aspect of the invention, there is provided apparatus for automatically selecting a font from a collection of fonts for use in one or more texts, wherein the apparatus comprises: means for automatically selecting one or more fonts from said collections of fonts, based on information associated with said one or more texts; and means for setting the font of the one or more texts to one of the selected one or more fonts.

According to another aspect of the invention, there is provided apparatus for automatically selecting a font from a collection of fonts for use in one or more hyperlink texts, wherein the one or more texts are in an initial font and the apparatus comprises: means for automatically selecting one said font from said collections of fonts, based on information associated with said one or more hyperlink texts; and means for replacing the font of the one or more hyperlink texts with the selected font.

According to another aspect of the invention, there is provided a computer program product comprising a computer program for automatically selecting a font from a collection of fonts for use in one or more captions associated with one or more images, wherein the computer program comprises: means for automatically selecting one or more fonts from said collections of fonts, based on information provided with the one or more images; and means for setting the font of the one or more captions to one of the selected one or more fonts.

According to another aspect of the invention, there is provided a computer program product comprising a computer program for automatically selecting a font from a collection of fonts for use in one or more captions associated with one or more images, wherein the computer program comprises: means for analysing meta-data associated with the one or more images to determine a key feature amongst the meta-data; means for searching a library of fonts, each said font having a set of one or more associated key features; means for automatically selecting one or more fonts from the font library having an associated said key feature best matching the said determined key feature; and means for setting a font of the one or more captions to one of the selected one or more one fonts.

According to another aspect of the invention, there is provided a computer program product comprising a computer program for automatically selecting a theme from a collection of themes for use in one or more objects associated with one or more pages, wherein the computer program comprises: means for automatically selecting one or more themes from said collections of themes, based on information provided with the said one or more pages; and means for setting the theme of the one or more objects with one of the selected one or more themes.

According to another aspect of the invention, there is provided a computer program product comprising a computer program for automatically selecting a font from a collection of fonts for use in one or more texts, wherein the computer program comprises: means for automatically selecting one or more fonts from said collections of fonts, based on information associated with said one or more texts; and means for setting the font of the one or more texts to one of the selected one or more fonts.

According to still another aspect of the invention, there is provided a computer program product comprising a computer program for automatically selecting a font from a collection of fonts for use in one or more hyperlink texts, wherein the one or more texts are in an initial font and the computer program comprises: means for automatically selecting one said font from said collections of fonts, based on information associated with said one or more hyperlink texts; and means for replacing the font of the one or more hyperlink texts with the selected font.

BRIEF DESCRIPTION OF THE DRAWINGS

A number of preferred embodiments of the present invention will now be described with reference to the drawings, in which:

FIG. 2(*b*) is a representation of an exemplary image and a caption provided by the method of FIG. 1 operating on the image and caption shown in FIG. 2(*a*);

FIG. 4(*b*) is a representation of an exemplary web page and a number of links provided by the method of FIG. 3 operating on the web page and the hyperlinks shown in FIG. 4(*a*)

DETAILED DESCRIPTION INCLUDING BEST MODE

Figure 1:
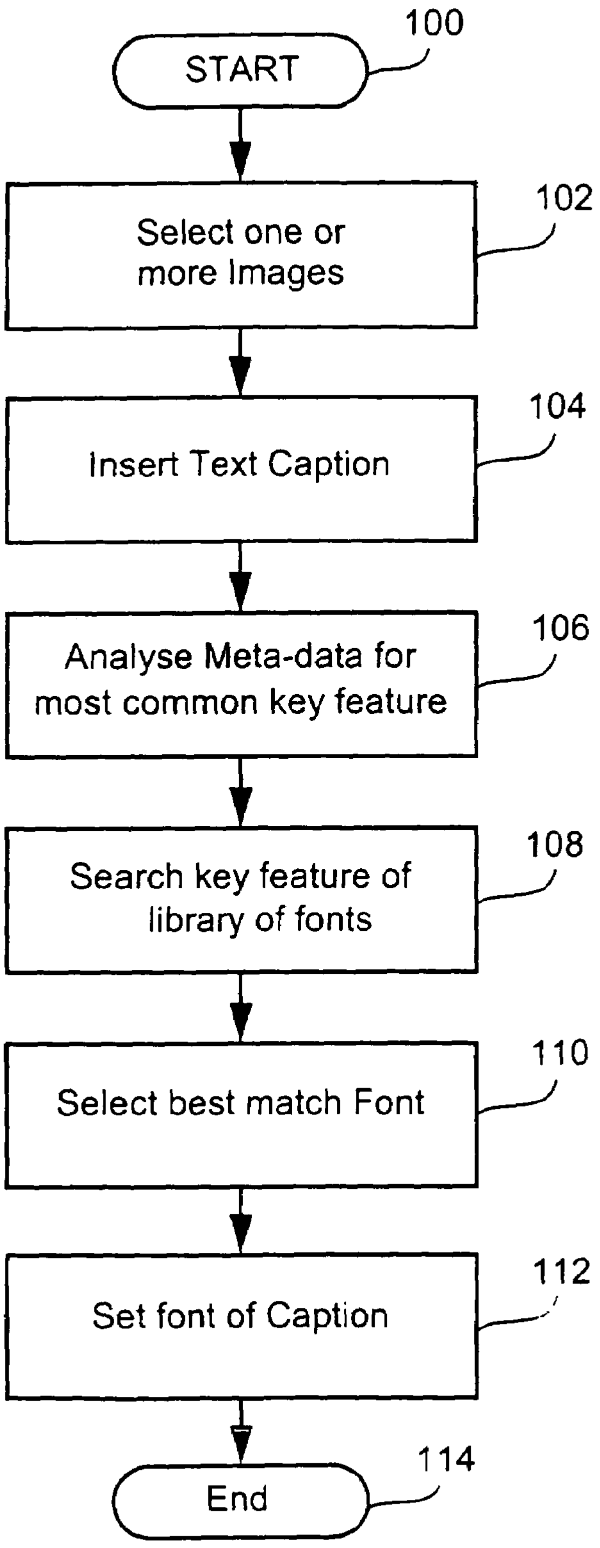
FIG. 1 is a flow diagram of a method of automatically selecting decorative fonts for use in captions.

The principles of the method described herein have general applicability to automatically providing a font to text, based on information associated with said text. However, for ease of explanation, two embodiments of the method are described. Firstly, a method of automatically selecting decorative fonts for use in captions, based on information provided with images that the captions are associated with. Secondly, a method of automatically selecting a font for use in hyperlinks, based on information associated with the hyperlinks.

Some portions of the detailed descriptions, which follow are explicitly or implicitly presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, bytes, characters, text, strings, fonts, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilising terms such as "selecting", "searching", "analysing", "replacing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. The algorithms and displays presented herein are not inherently related to any particular computer or other apparatus. Various general-purpose machines may be used with programs in accordance with the teachings herein, or it may prove convenient to construct more specialised apparatus to perform the required method steps. The structure of a conventional general-purpose computer will appear from the description below.

In addition, the present invention also relates to a computer readable medium comprising a computer program for implementing the preferred methods. The computer readable medium "includes a computer storage medium and a transmission medium. The computer storage medium" may include storage devices such as magnetic or optical disks, memory chips, or other storage devices suitable for interfacing with a general-purpose computer. "The transmission medium may also include a hard wired medium such as exemplified in the Internet system, or wireless medium such as exemplified in the GSM mobile telephone system". The computer program is not intended to be limited to any particular programming language and implementation thereof. It will be appreciated that a variety of programming languages and implementations thereof may be used to implement the teachings of the invention as described herein.

First Embodiment of Method

FIG. 1 shows a flow diagram of a method of automatically selecting decorative fonts for use in captions, based on information provided with the images that the captions are associated with. This method is particularly useful in automatic electronic album layout applications, which accept digital images as input and automatically lays them out on pages, forming an album. In this regard, the font selection method may form a sub-routine of the electronic album layout application.

The method commences at step 100, where any necessary parameters are initialized. The method then continues to step 102, where a user selects one or more images, displayed on the computer monitor, for applying a caption. The selection can be decided on an image basis, a multiple image basis, a page basis comprising a plurality of images, or a per album basis comprising a plurality of images. The method continues to step 104, where the user inserts the text caption(s) at the desired place(s) in the album. The text caption(s) may be inserted adjacent to the images or in the images themselves. The text captions are initially displayed in a predefined default font. Preferably, the user can select the predefined default font during the initialization stage 100. In a variation of this method, the predefined default font is preset without the need for any user interaction.

The method then analyses 106 meta-data associated with each of the selected images to find the most common key feature amongst all the meta-data of the images. In the event there is only one image, the meta-data for that image is selected as the common key feature. The method then searches 108 a library of fonts, each font having a set of one or more associated key features. The method then selects 110 the font of the font library having an associated key feature(s) best matching the common key feature. The method then sets 112 the font of the text caption(s) with the font selected in step 110. The method terminates at step 114.

During step 108, if the method is unable to find a font best matching the key features, the method informs the user of such and the method terminates 114. In this situation, the font of the text captions is not changed and remains in the predefined default font. Similarly, if the method is unable to find any meta-data associated with the images, the method informs the user of such and the method terminates 114. Again, the font of the text captions is not changed and remains in the predefined default font.

In a variation of this method, the method selects 110 and displays a number of fonts best matching the associated key feature(s) and the user selects that font of these number of fonts the user so desires. The number of fonts best matching the associated key feature(s) may be indexed according to a predetermined ranking.

In a still further variation of the method, the method undertakes the analysing 106, searching 108, and selection 110 steps prior to the insertion of the text caption. The method then sets 112 the 'default' font to the selected font. The user can then insert and display the text caption already in the selected font.

The method can select the decorative font to be used in a caption on a per image basis, a multiple image basis, a per page basis, or a per album basis. For a particular caption, the font selected may vary depending on which of these options is preferred.

In the per image option, a caption is associated with only one image. Meta-data included with the digital images that can be used in selecting the decorative font for the caption, can include the following:

(a) Date
(b) Time of day
(c) Location (GPS) information
(d) User provided keywords
(e) Colour information, etc.

Figure 2A:
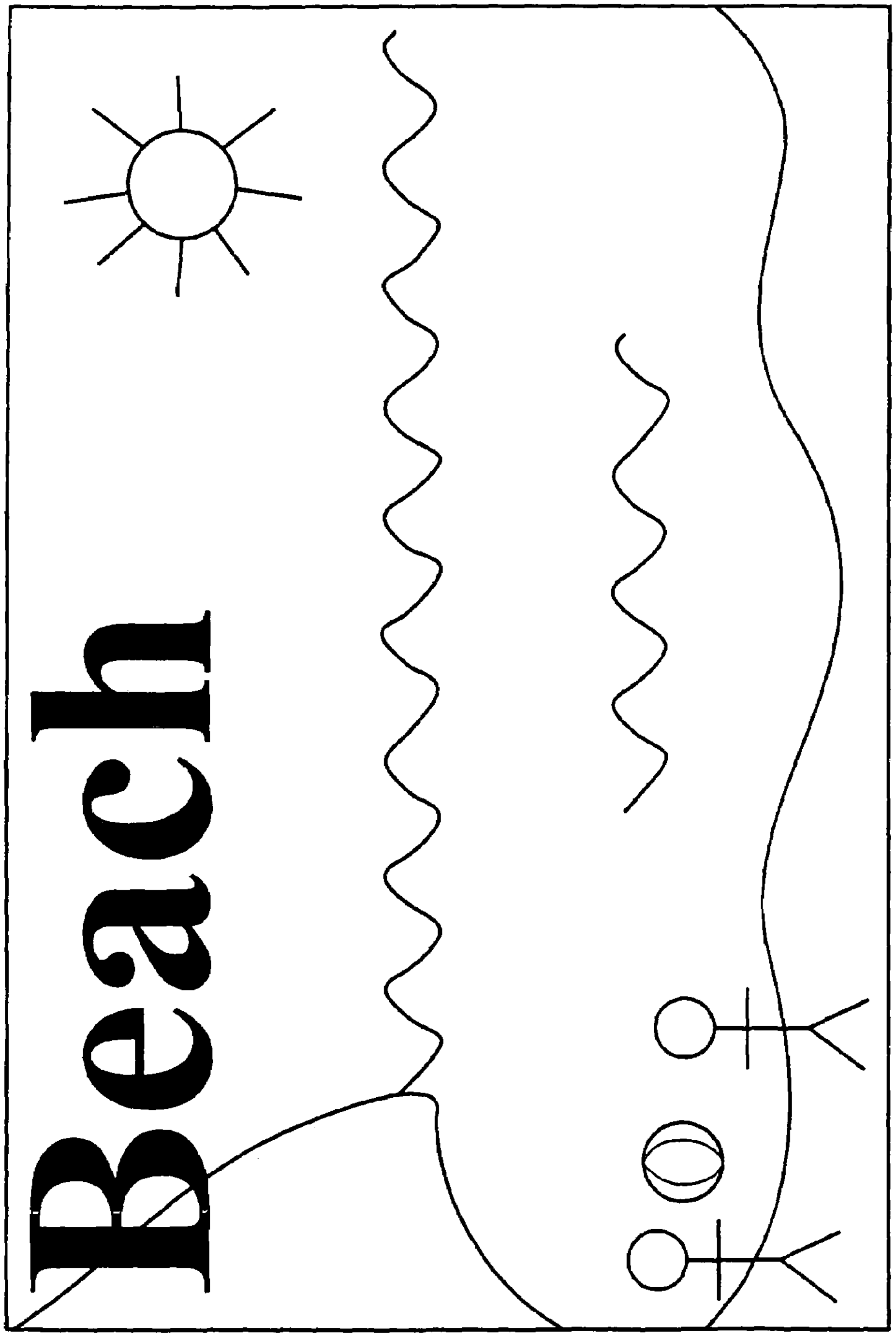
FIG. 2(*a*) is a representation of an exemplary image and caption in an electronic photo album.
Figure 2B:
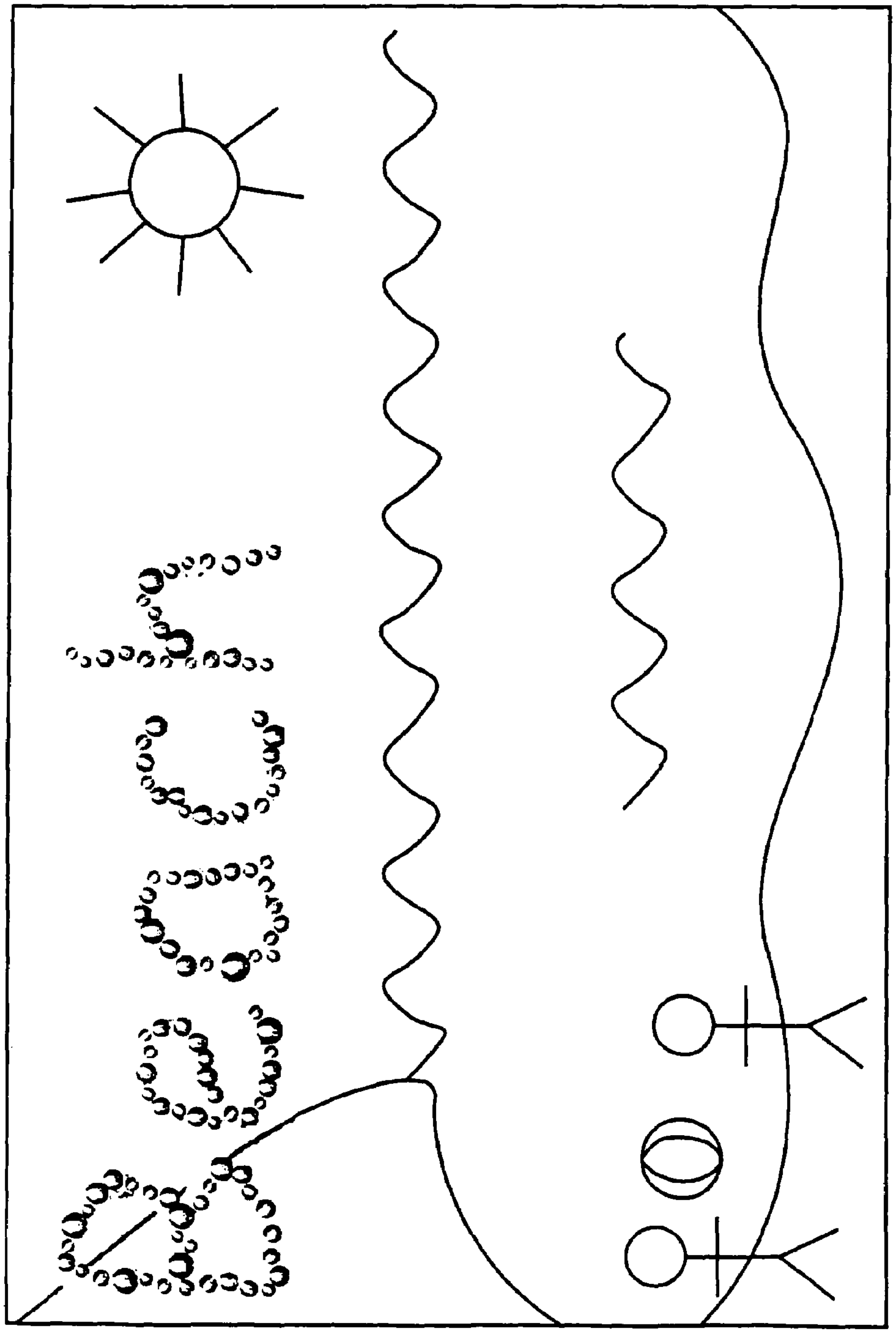

This type of information (viz meta-data) provided by the image is sufficient for automatic selection of a decorative font. For example, if an image of a beach is to be placed on a page, with keyword information "sea-side", the caption for this image could then be shown in a sea-side font. Turning now to FIG. 2(*a*), there is shown a representation of an exemplary image and caption in an electronic photo album. This image has also associated therewith keyword information (not shown) of "sea-side". Turning now to FIG. 2(*b*), there is shown a representation of an exemplary image and a caption provided by the method of FIG. 1 operating on the image and caption of FIG. 2(*a*). As can be seen, the font has been changed from a standard font to a "sea-side" font. If the next image in the album has the keyword "tree" the corresponding caption could use the bush font etc.

In the multiple image option, any number of images, from any album page can be selected. The information from these images is analysed and a common key feature is used to select the new decorative font.

In the per page option the same style caption could be applied to multiple captions within a page. The images are grouped based on similarities in the above image information, to aid the selection of the font. Such groupings might include:

(a) Same date and time within a particular range (b) Same date and location (c) Keyword matching (d) Same date and keyword (e) Colour similarities, etc.

If the images for the page are fixed, that is, the images in the album are to be laid in a specific order, the information from the images on the current page can be examined and grouped to find commonalities. One method of determining the decorative font to be used on a page, is to use a ranking system to distinguish between the different types of common information that might exist amongst a set of images. The feature considered the most common or important can then be mapped to a decorative font to be used, or a new one generated and then used.

In some cases the images for a page are not fixed, that is, any image from the set for the album can be set on any page. In this case, all the images can be used to determine subsets of related images, based on the provided information, that should be grouped together. A decorative font for the captions could then be chosen for each page based on these image groupings.

In per album option, a decorative font is determined to be used for all images across an album. In this case, all images should be examined to find a common set of information across the whole album to be used to select a decorative font.

Matching the information provided to a particular decorated font can be done using a keyword matching system, where the font that best matches will be used. An extension of this would be to generate new fonts where an appropriate match is not found. When considering selecting a font on a page or album basis, it may be appropriate to provide more than one font that relates to the information provided. In addition, if appropriate for the particular caption, the selection of a font on a per caption basis could be extended to selecting multiple fonts to be used within the one caption.

This method can be extended further, to choosing a theme which can be applied not only to captions, but to the image frames, the background, surrounding clip-art, and anything else on the page that is alterable, based on meta-data associated with the page. In addition, the image information provided can be combined with well-known calendar dates for use in selecting a theme. For example, if a group of images is dated Christmas day, a Christmas theme can be selected. Or if they are dated with a birthday, a birthday theme selected. A travel theme, including a travel caption font, could be applied to an album where it has been detected that all the images were taken overseas. This method of choosing a theme is essentially the same as the previous method of choosing a font and minor modifications are only needed. In this variation of the method a library of fonts is extended to a library of themes and the selection of the theme is determined upon one or more key features associated with objects on the page. In another example, the embodiment may be used in graphic art software applications.

This method can also be applied, to selecting a font from a collection of fonts for use in one or more texts to be displayed and/or printed. The method selects a font from the collection of fonts best matching a key feature, based on information associated with the one or more texts per se, and sets the font of the text to the selected font. This method of choosing a font is essentially the same as the previous method of choosing a font and minor modifications are only needed. In this variation of the method the selection is based on the content of the text or meta data associated with the text. In this particular variation of the method, it is likely that the text will already have predefined font attributes. If this is the case, the selected font will override these font attributes.

Second Embodiment of Method

Figure 3:
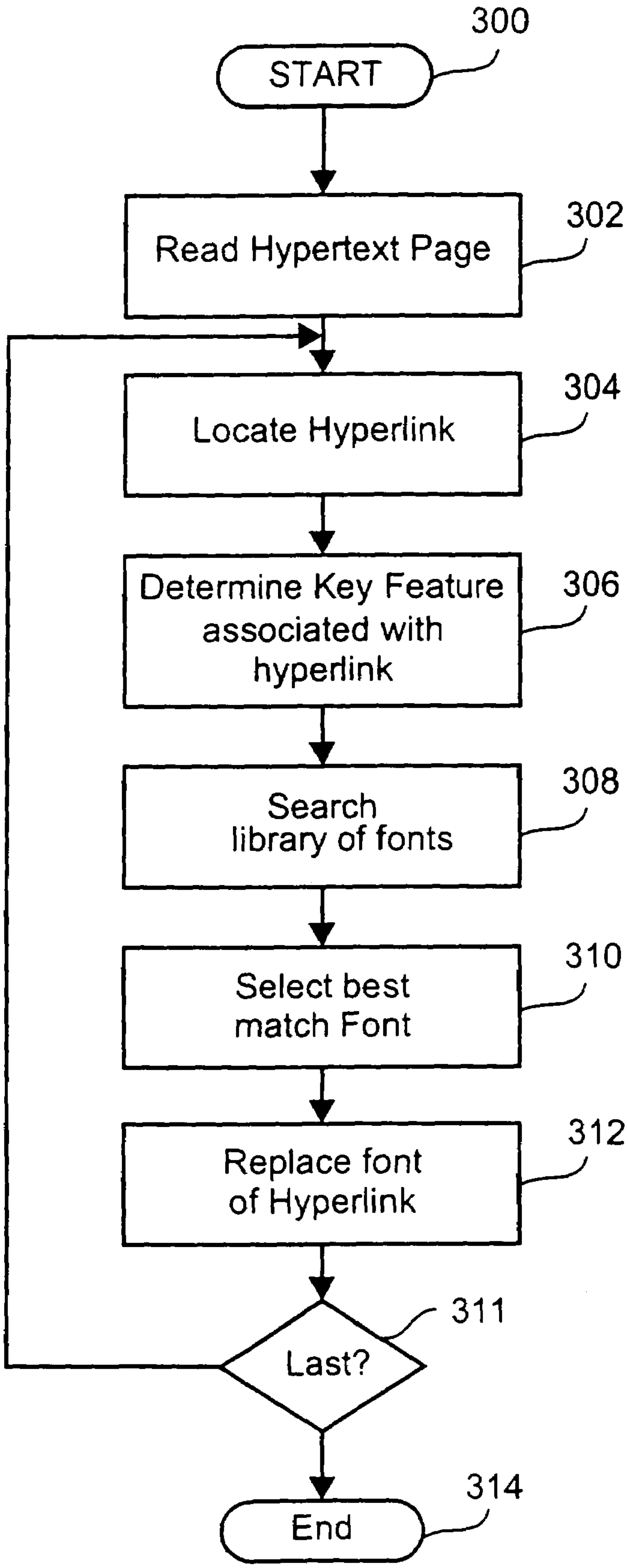
FIG. 3 is a flow diagram of a method of automatically selecting a font for use in hyperlinks.

FIG. 3 is a flow diagram of a method of automatically selecting a font for use in hyperlinks, based on information associated with the hyperlinks. The present embodiment automatically enhances the distinguishability of hyperlinks on hypertext pages, especially when printed, in order to considerably improve their readability. Namely, this embodiment is concerned with creating decorative hypertext links to enhance their distinguishability: (a) from regular body text and (b) from each other. This method is particularly useful in web browser applications. In this regard, the font selection method may form a sub-routine of the web browser application.

The method commences at step 300, where any necessary parameters are initialised. The method then continues to step 302, where a hypertext page is down-loaded from the world wide web and read by a web browser. The method then performs the following steps for each hyperlink in turn.

The method locates 304 a current hyperlink in the down-loaded hyper-text. The method then determines 306 a key feature associated with the current hyperlink. This key feature can be in the form of meta-data associated with or derived from the current hyperlink. Some key features are described in more detail below. The method then searches 308 a library of fonts, each font having a set of one or more associated key features. Preferably, the library of fonts is stored at the browser end rather than on the Web. The method then selects 310 the font of the font library having an associated key feature(s) best matching the key feature determined in step 306. The method then replaces 312 the font of the current hyperlink with the font selected in step 310. The method then continues to a decision block 311, where the method checks whether the current hyperlink is the last hyperlink in the hypertext. If the decision block returns true, the method terminates 314. Otherwise the method continues to step 304 for the next hyperlink in the hypertext for processing. In this way the method is able to improve the distinguishability of the hyperlinks without the transmission of a previously decorated font. The browser only displays the resultant image.

Preferably, the method overrides the font attributes of the hyperlinks predefined by the html source page. However, if the method is unable to find during step 308 a font best matching the key features of a hyperlink, the method proceeds to the next hyperlink 304 or if there are no more hyperlinks terminates 314. In this situation, the font of the current hyperlink is not changed and remains in the font predefined by the html source page for that hyperlink. Similarly, if the method is unable to determine any key features associated with the hyperlink, the method proceeds to the next hyperlink 304 or if the are no more hyperlinks terminates 114. Again, the font of the hyperlink is not changed and remains in the font predefined by the html source page for that hyperlink.

The method can select the decorative font to be used in hyperlinks on a per hyperlink basis, a multiple hyperlink basis, or on a per web page basis. In the latter two cases, the method determines a common key feature amongst a plurality of hyperlinks and searches the library of fonts for this common key feature.

The font library contains a variety of fonts, which can be used to replace the existing font of the hyperlink. These fonts are intended to be chosen so as to distinguish the hyperlinks from their surroundings. These include:

Different font and font style (weight, italicisation, etc);
Different font size (usually larger);
Usage of decorative fonts;
Usage of animated decorative fonts.

For maximal impact, a custom created decorative font can be used to ensure the text is distinguished from the surrounding text. An example of such decorative fonts are disclosed in Australian patent application No 84252/98. In addition, these latter decorative fonts may be easily animated to aid distinguishability on computer displays.

There are a number of key features, which can be used alone or in combination when deciding on the font to be used for a hyperlink. The key features can include:

Hyperlink type, for example, http, ftp, shttp, mailto;
Content of the hypertext;
Address of the hyperlink;
Content of the page.

Firstly, the key feature may be based on the type of a hyperlink. If the hyperlink type is http or shttp or one of a variety of other types, the page being linked to is another text based page. As such, it can be presented in a style to indicate its textual content. On the other hand if the hyperlink type is ftp it indicates a reference to a file to be obtained using the file transfer protocol. A link of this sort may be distinguished by, for example, displaying the text in a fixed-width font and embedding it into an image that conveys the notion of a file. This may be extended to cover links with audio content, audiovisual content, plain text documents and other document types well known to those skilled in the art.

Secondly, the key feature may be based on the content of the hypertext. Using techniques such as keyword analysis and matching, the category of the hypertext can be determined. This can subsequently be used to automatically select an appropriate appearance for the decorated hypertext. For example, if the keyword "car" is encountered in the hypertext, a font may be chosen that forms the letters from images of cars placed along the strokes of the text. Similarly, for other everyday objects that may be encountered as keywords in the hypertext. In the preferred embodiment, this is implemented by utilising a table of objects and matching image files, and then forming the decorative font characters for the letters in the hypertext using the keyword image. To avoid the appearance of the hypertext being too busy, a single font should be applied to the whole hypertext string, although of course the technique could be applied to create a different appearance for every keyword encountered in a hypertext string.

Figure 4A:
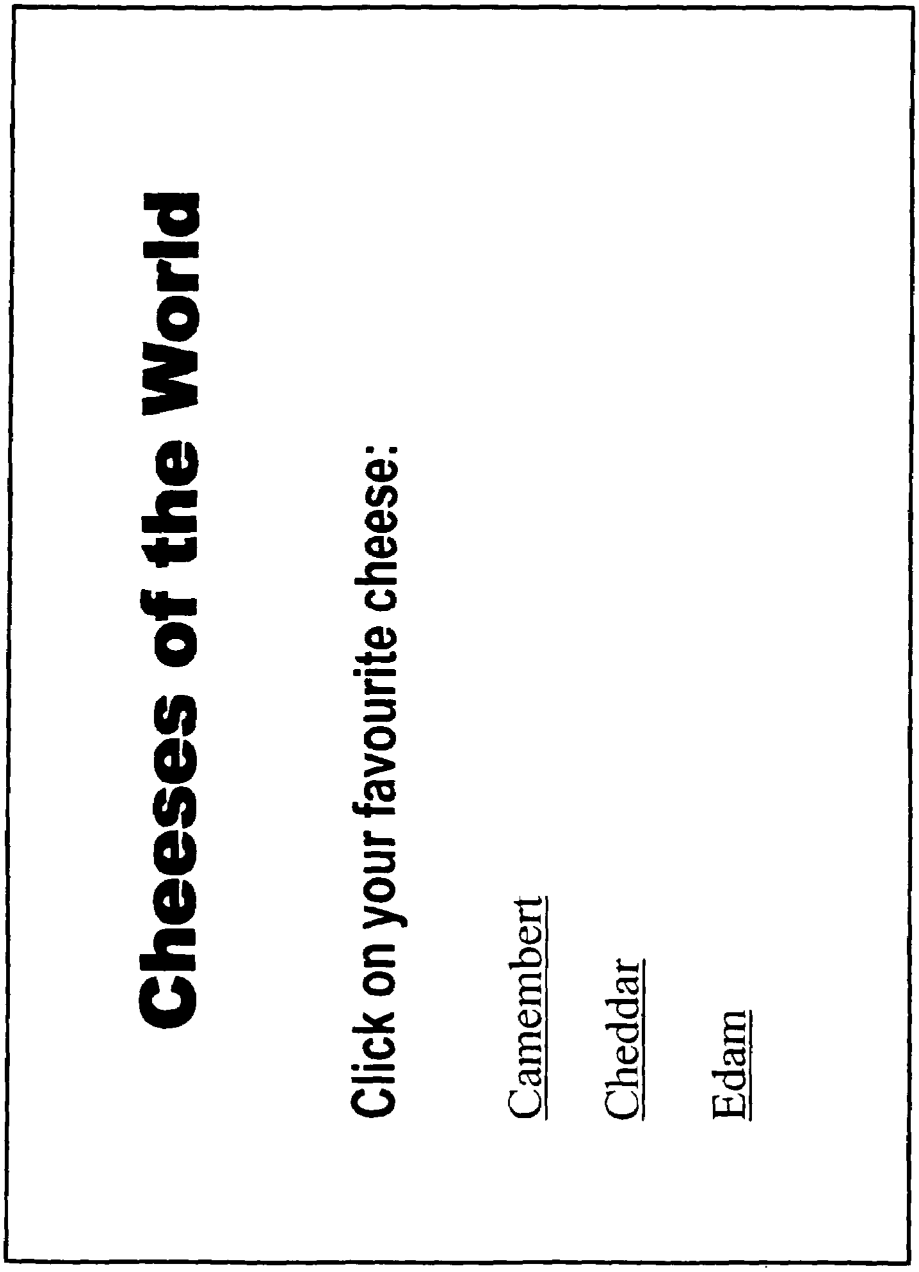
FIG. 4(*a*) is a representation of an exemplary web page and a number of hyperlinks.
Figure 4B:
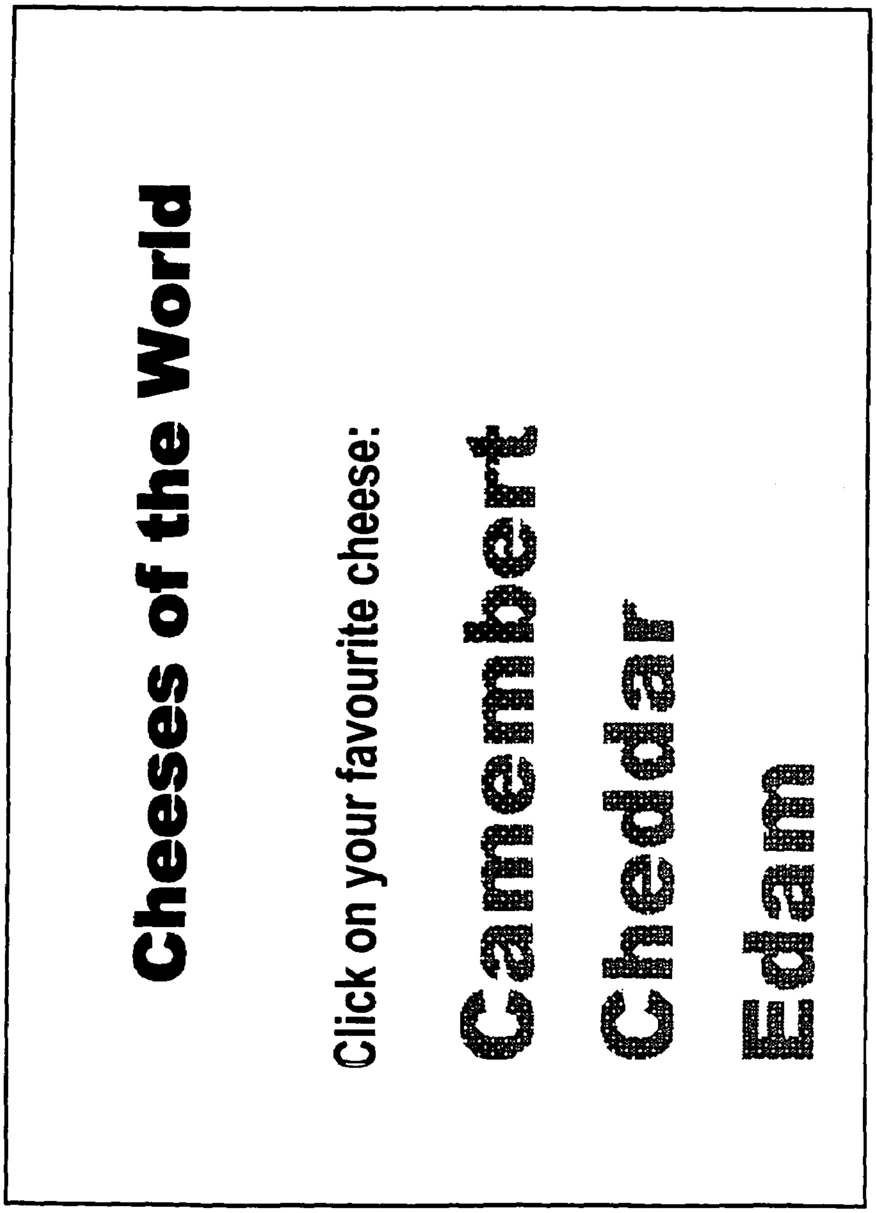

An example of such, is shown with reference to FIGS. 4(*a*) and 4(*b*). Turning now to FIG. 4(*a*), there is shown a representation of an exemplary web page and a number of hyperlinks. The web page contains text "Cheeses of the World" and "Click on your favourite cheese:" together with hyperlinks "Camembert", "Cheddar", and "Edam". The method uses keyword matching and analysis to determine, in this case, a keyword of cheese. The method then selects a font best matching this keyword from the font library. The method then replaces the font of the hyperlinks with this best matching font. Turning now to FIG. 4(*b*), there is shown a representation of an exemplary web page and a number of hyperlinks that have been provided by the method of FIG. 3 operating on the web page of FIG. 4(*a*). As can be seen, the font has been changed from a standard font to a more distinctive "cheese" font.

Thirdly, the key feature may be based on the address of the hyperlink. There are likely to be keywords of interest in the actual URL or uniform resource locator. These could be matched as described for the content of the hypertext. Matching the URL against key URLs is also possible, for example to identify the root of a site, or a home page.

Fourthly, the key feature may be based on the content of the hypertext page. This is the final consideration and could involve identifying the keywords in the surrounding text, or analysis of the whole page for the frequency of keywords. A predominant keyword could then be used to decide that a page matched a particular class of page, and from this the general style of the hypertext links could be determined.

In most situations, the techniques described above need to be applied in combination. The user could choose to guide the process, or not as the case may be.

Embodiment of Apparatus

Figure 5:
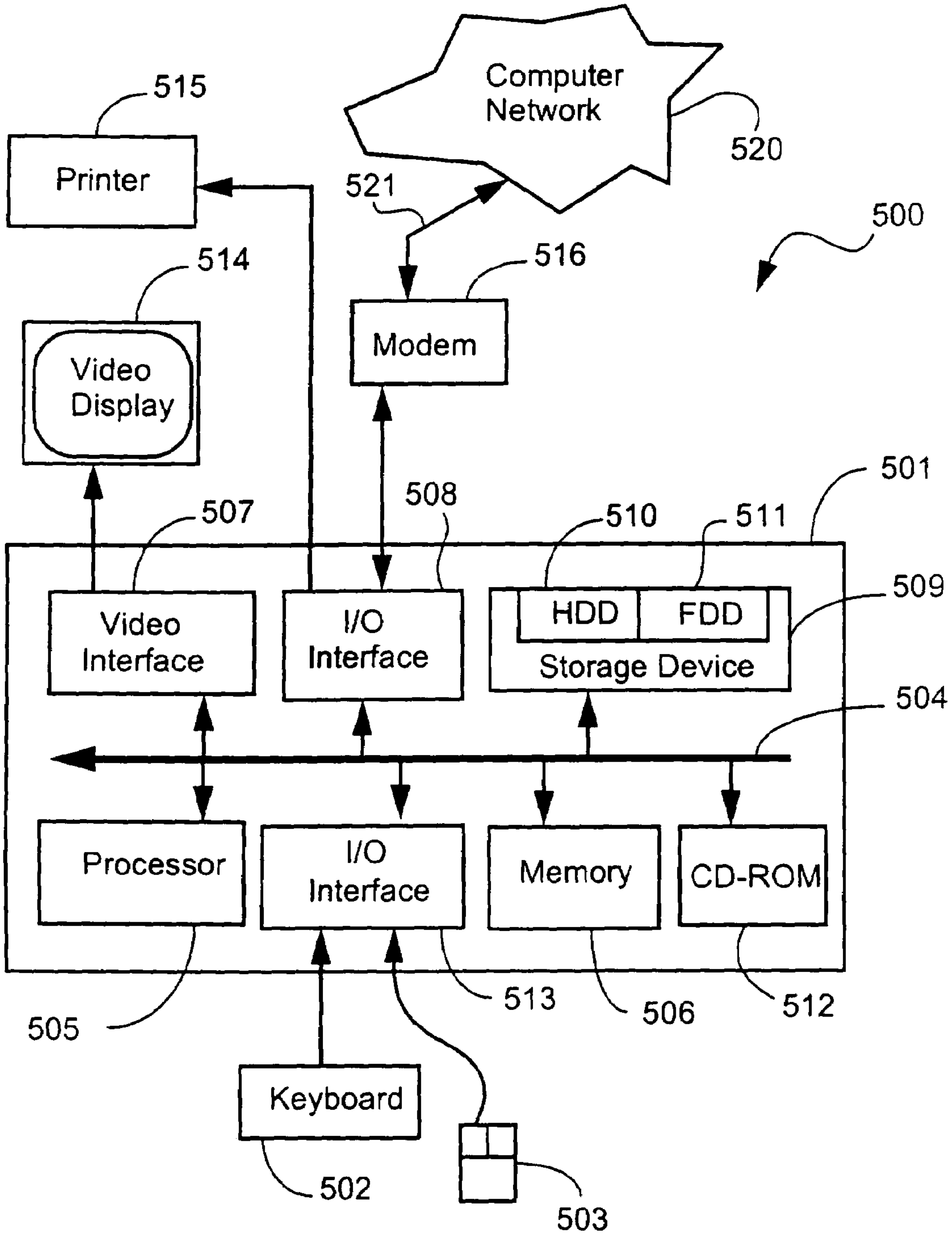
FIG. 5 is a schematic block diagram of a general-purpose computer upon which the methods of FIGS. 1 or 3 can be practiced.

The methods of FIG. 1 or 3 are preferably practiced using a conventional general-purpose computer system 500, such as that shown in FIG. 5, wherein the steps of FIG. 1 or 3 may be implemented as software, such as an application program executing within the computer system 500. In particular, the steps of methods of FIG. 1 or 3 are effected by coded instructions in the software that are carried out by the computer. The software may be divided into two separate parts; one part for carrying out the automatic font selection method; and another part to manage the user interface between the latter and the user. The software may be stored in a computer readable medium, including the storage devices described below, for example. The software is loaded into the computer from the computer readable medium, and then executed by the computer. The use of the computer readable medium in the computer preferably effects an advantageous apparatus for automatic font selection in accordance with the embodiments of the invention.

The computer system 500 comprises a computer module 501, input devices such as a keyboard 502 and mouse 503, output devices including a printer 515 and a display device 514. A Modulator-Demodulator (Modem) transceiver device 516 is used by the computer module 501 for communicating to and from a communications network 520, for example connectable via a telephone line 521 or other functional medium. The modem 516 can be used to obtain access to the Internet, and other network systems, such as a Local Area Network (LAN) or a Wide Area Network (WAN).

The computer module 501 typically includes at least one processor unit 505, a memory unit 506, for example formed from semiconductor random access memory (RAM) and read only memory (ROM), input/output (I/O) interfaces including a video interface 507, and an I/O interface 513 for the keyboard 502 and mouse 503 and optionally a joystick (not illustrated), and an interface 508 for the modem 516. A storage device 509 is provided and typically includes a hard disk drive 510 and a floppy disk drive 511. A magnetic tape drive (not illustrated) may also be used. A CD-ROM drive

512 is typically provided as a non-volatile source of data. The components 105 to 513 of the computer module 501, typically communicate via an interconnected bus 504 and in a manner which results in a conventional mode of operation of the computer system 500 known to those in the relevant art. Examples of computers on which the embodiments can be practised include IBM-PC's and compatibles, Sun Sparcstations or alike computer systems evolved therefrom.

Typically, the application program of the embodiment is resident on the hard disk drive 510 and read and controlled in its execution by the processor 505. Intermediate storage of the program and any data fetched from the network 520 may be accomplished using the semiconductor memory 506, possibly in concert with the hard disk drive 510. In some instances, the application program may be supplied to the user encoded on a CD-ROM or floppy disk and read via the corresponding drive 512 or 511, or alternatively may be read by the user from the network 520 via the modem device 516. Still further, the software can also be loaded into the computer system 500 from other computer readable medium including magnetic tape, a ROM or integrated circuit, a magneto-optical disk, a radio or infra-red transmission channel between the computer module 501 and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The methods of FIG. 1 or 3 may alternatively be implemented in dedicated hardware such as one or more integrated circuits performing the functions or sub functions of FIG. 1 or 3. Such dedicated hardware may include graphic processors, digital signal processors, or one or more microprocessors and associated memories.

INDUSTRIAL APPLICABILITY

It is apparent from the above that the embodiment(s) of the invention are applicable to the computer and data processing industries, particularly computer graphics.

The foregoing describes only some embodiments of the present invention, and modifications and/or changes can be made thereto without departing from the scope and spirit of the invention, the embodiment(s) being illustrative and not restrictive.

We claim:

1. A method of selecting a font from a collection of fonts for use in one or more captions associated with a plurality of images, the images having associated meta-data, said method comprising the steps of:

analyzing the meta-data associated with the plurality of images to find commonalities in key features in the meta-data;

determining from the analysis step a most common key feature among the commonalities in said key features in the meta-data associated with the plurality of images;

displaying, from said collection of fonts comprising a plurality of fonts having a set of one or more associated key features, a number of fonts best matching the most common key feature determined in said determining step;

selecting a desired font from the displayed fonts; and setting a font of the one or more captions to the selected desired font.

2. A method according to claim 1, wherein the associated meta-data comprises one or more of the following: Time of day; Location information; User provided keywords; and Color information.

3. A method according to claim 1, wherein the key features are selected from the group consisting of: (a) Same date and time within a particular range; (b) Same date and location; (c) same Keyword matching; (d) Same date and keyword; and (e) same Color similarities.

4. A method according to claim 1, further comprising the step of inserting and displaying the one or more captions associated with the plurality of images in a predefined default font, prior to said analyzing step.

5. A method according to claim 4, wherein said setting step includes:

replacing the predefined default font with the selected font, and displaying the one or more captions associated with the plurality of images in the replaced font.

6. A method according to claim 4, wherein if the meta-data associated with the plurality of images is not found in said analyzing step, the one or more captions remain in the predefined default font.

7. A method according to claim 4, wherein if a best matching key feature is not found in said displaying step, the one or more captions remain in the predefined default font.

8. A method according to claim 1 further comprising the step of inserting and displaying the one or more captions associated with the plurality of images in the selected font.

9. A method according to claim 1, wherein said setting step includes:

manually selecting one of the displayed fonts by a user; and setting the font of the one or more captions to the manually selected font.

10. A method according to claim 1, wherein said captions comprise hyperlinks in a hypertext document, and wherein the analyzing step further comprises analyzing the one or more hyperlinks or the hypertext document for information associated with the one or more hyperlinks to find commonalities in key features of the associated information.

11. A method according to claim 10, wherein the associated information comprises the type and content of the one or more hyperlinks.

12. An apparatus for selecting a font from a collection of fonts for use in one or more captions associated with a plurality of images, said images having associated meta-data, said apparatus comprising:

means for analyzing the meta-data associated with the plurality of images to find commonalities in key features in the meta-data;

means for determining from results provided by said means for analyzing, a most common key feature among the commonalities in said key features in the meta-data associated with the plurality of images;

means for displaying, from said collection of fonts comprising a plurality of fonts having a set of one or more associated key features, a number of fonts best matching the most common key feature determined by said means for determining;

means for selecting a desired font from the displayed fonts; and means for setting a font of the one or more captions to the selected desired font.

13. The apparatus according to claim 12, wherein said captions comprise hyperlinks in a hypertext document, and wherein said means for analyzing further analyzes the one or more hyperlinks or the hypertext document for information associated with the one or more hyperlinks to find commonalities in key features of the associated information.

14. A computer program product comprising “computer-readable program code recorded in a computer-readable storage medium”, for controlling the operation of a data processing apparatus on which the program code executes to perform a method of selecting a font from a collection of fonts for use in one or more captions associated with a plurality of images, the images having associated meta-data, said method comprising the steps of:

analyzing the meta-data associated with the plurality of images to find commonalities in key features in the meta-data;

determining from said analyzing step a most common key feature among the commonalities in said key features in the meta-data associated with the plurality of images;

displaying, from said collection of fonts comprising a plurality of fonts having a set of one or more associated key features, a number of fonts best matching the most common key feature determined in said determining step;

selecting a desired font from the displayed fonts; and setting a font of the one or more captions to the selected desired font.

15. The computer program product according to claim 14, wherein said captions comprise hyperlinks in a hypertext document, and wherein said means for analyzing further analyzes the one or more hyperlinks or the hypertext document for information associated with the one or more hyperlinks to find commonalities in key features of the associated information.

* * * * *

UNITED STATES PATENT AND TRADEMARK OFFICE

CERTIFICATE OF CORRECTION

PATENT NO. : 7,197,707 B2 
APPLICATION NO. : 09/785292
DATED : March 27, 2007
INVENTOR(S) : Lorenzo Cicchitelli et al.

It is certified that error appears in the above-identified patent and that said Letters Patent is hereby corrected as shown below:

COLUMN 5

Line 38, “"includes” should read --includes--.
Line 39, “medium"” should read --medium,--.
Line 42, “"The” should read --The--.
Line 45, “system".” should read --system.--.

COLUMN 12

Line 1, “A” should read --The--.
Line 5, “A” should read --The--.
Line 10, “A” should read --The--.
Line 14, “A” should read --The--.
Line 20, “A” should read --The--.
Line 24, “A” should read --The--.
Line 27, “A” should read --The--.
Line 30, “A” should read --The--.
Line 36, “A” should read --The--.
Line 42, “A” should read --The--.

COLUMN 13

Line 4, “"computer-” should read --computer- --.
Line 6, “medium",” should read --medium--.

Signed and Sealed this

Eighteenth Day of December, 2007

JON W. DUDAS
*Director of the United States Patent and Trademark Office*